Feb. 14, 1961 W. COUPETTE ET AL Re. 24,936

METAL CONTAINER ADAPTED TO RECEIVE HIGH-MELTING POINT LIQUID METALS

Original Filed Dec. 3, 1954 2 Sheets-Sheet 1

United States Patent Office

Re. 24,936
Reissued Feb. 14, 1961

24,936

METAL CONTAINER ADAPTED TO RECEIVE HIGH-MELTING POINT LIQUID METALS

Werner Coupette, Adolf Sickbert, and Rudolf Westib, Wattenscheid, Germany, assignors to Leybold-Hochvakuum-Anlagen, G.m.b.H., Koln-Bayental, Germany Original No. 2,784,961, dated Mar. 12, 1957, Ser. No. 472,978, Dec. 3, 1954. Application for reissue Feb. 3, 1959, Ser. No. 790,994

Claims priority, application Germany Dec. 5, 1953

3 Claims. (Cl. 266—42)

Figure 1:
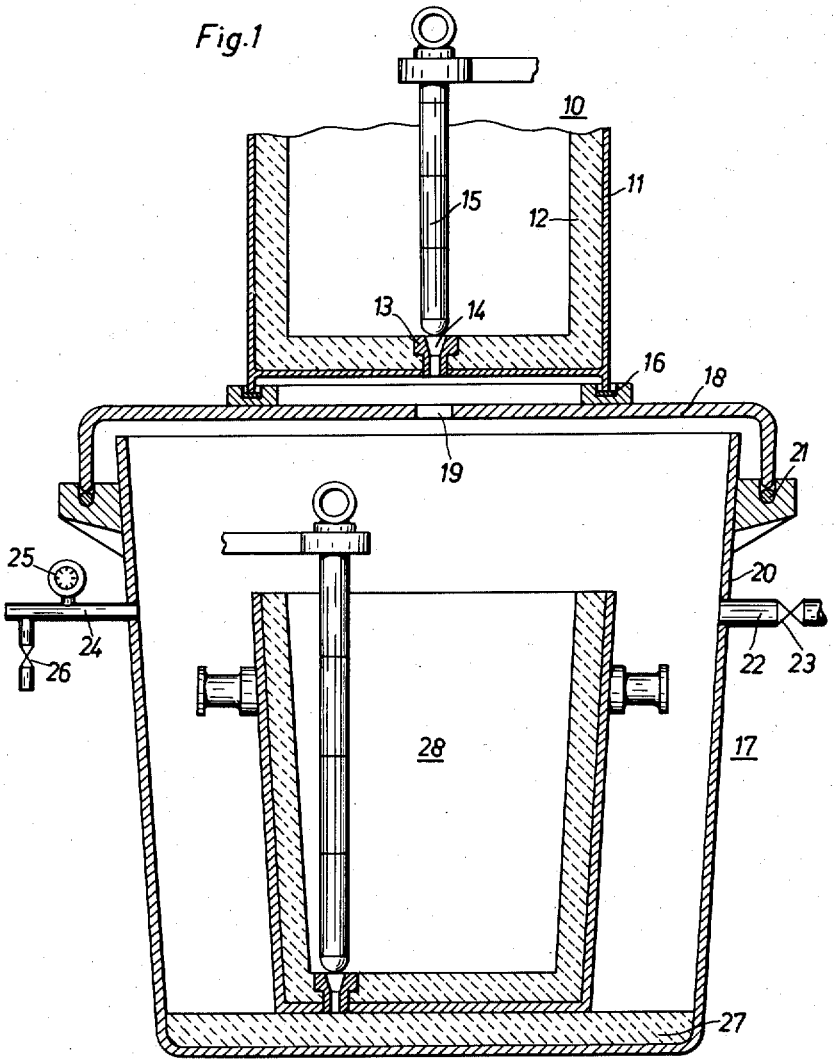

Matter enclosed in heavy brackets [ ] appears in the original patent but forms no part of this reissue specification; matter printed in italics indicates the additions made by reissue.

The present invention relates to the treatment of high-melting point molten metals, e.g. steel, by withdrawing undesired gas therefrom or by bringing the molten metal in contact with desired gases in order to improve the properties of the metal. For this purpose, a vessel is used, which, on the one hand, is adapted to be evacuated, and which, on the other hand, is provided with means for introducing gas. The molten metal is poured into the evacuated vessel through a hole in the lid thereof, and to this end a pouring ladle with a discharge hole in its bottom is placed on the lid of the evacuated vessel, so that the liquid metal can be transferred from the pouring ladle into the evacuated vessel. The pouring ladle rests on the lid of the evacuated vessel, and the seat of the pouring ladle is air-tightly sealed in order to prevent air from passing into the evacuated vessel, or gas from escaping into the atmosphere.

The pouring ladle is formed by a container suited to receive the high-melting point liquid metal, and it consists to this end of an outer metal shell provided with a lining of refractory material, and a nozzle is provided in the bottom of the container. The nozzle is formed by a body of ceramic material with a central bore therein, and it is inserted into the refractory lining and projects out of the metal shell.

It has been found that during the transfer of the liquid metal from the container into the evacuated vessel the vacuum therein deteriorates, in spite of a perfect seal between the bottom of the said liquid-metal container and the lid of the evacuated vessel, and it has been ascertained that this is due to the fact that air passes through unavoidable interspaces between the metal shell and the lining of the liquid-metal container, and even through the material of the lining itself. Moreover, a loss of gas has been ascertained, if it was desired, which is possible with the arrangement of this kind, to introduce gas under pressure from the lower vessel into the upper liquid-metal container.

It is therefore the object of the present invention to overcome the above mentioned difficulties, and particularly to stop the passage of gas through the unavoidable leakage paths in the wall of the liquid-metal container.

To this end a liquid-metal container suited to receive high-melting-point liquid metal, which comprises an outer metal shell, an interior lining for the metal shell which lining consists of a refractory material, a body of ceramic material inserted into the bottom of the said interior lining and projecting through the outer metal shell which body has an opening formed therein, is characterized in that a shield consisting of sheet metal is arranged so as to surround the said ceramic body and has two rims, the one rim being connected by welding to the inner face of the metal shell while the other rim projects into the interior of the container so as to extend into the liquid metal when the liquid-metal container is in operation. Thus the air or the gas, as the case may be, is stopped from passing through the small leakage channels, and the process of treating the metal can be controlled in a more reliable manner than hitherto.

The invention will be explained in more detail with reference to the accompanying drawings, wherein—

Figure 2:
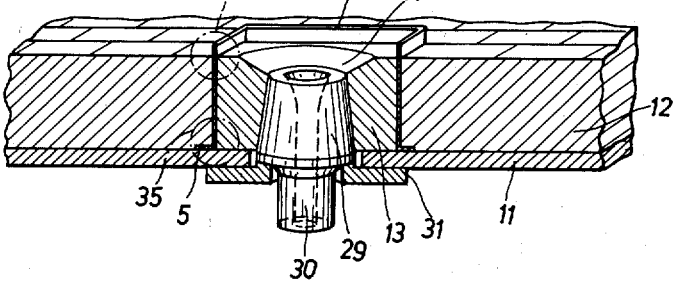
Figure 3:
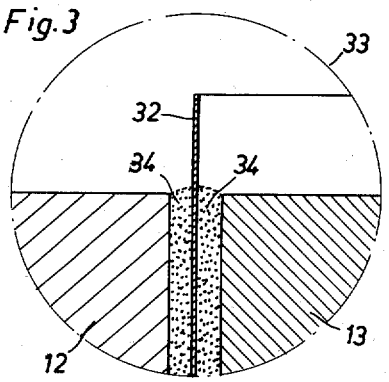
Figure 5:
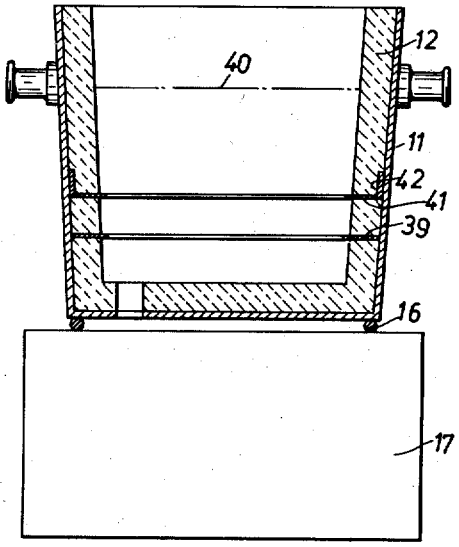
Figure 4:
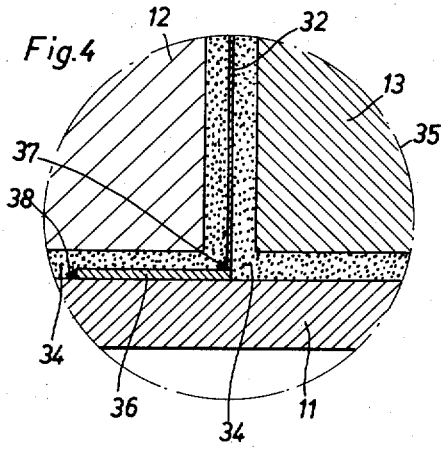

Fig. 1 represents a metal container which rests on the lid of an evacuated vessel suited for a vacuum treatment of the liquid metal, Fig. 2 shows a construction of the shield which surrounds the ceramic body in the bottom of the refractory interior lining, Figs. 3 and 4 illustrate on an enlarged scale two details of the arrangement according to Fig. 2, and Fig. 5 represents another embodiment of the invention.

Fig. 1 indicates the application of the invention to a metal container with a refractory interior lining (both shown in section), the metal container resting on a vacuum vessel. The metal container 10 consists of a metal shell 11 and of a refractory interior lining 12 consisting of a ceramic material, for instance fire-brick. A body 13 of ceramic material, having a nozzle 14, is inserted into the bottom of the interior lining 12 and into the bottom of the metal shell 11. A so-called stopper rod 15, which is adapted to be moved in a vertical direction, serves for closing the said nozzle. The whole metal container 10 rests on the vacuum vessel 17, the seat being sealed by means of a suitable sealing ring 16. The lid 18 of the vacuum vessel has an opening 19 through which the liquid metal jet can pass. The lid 18 is air-tightly connected with the vessel 20 by means of another ring-shaped seal 21. Into the lateral wall of the vessel 20 a pipe 22 opens which leads to a vacuum pump and comprises a valve 23. Another pipe 24 opens into the lateral wall of the evacuated vessel 20 to which a pressure measuring device or a vacuum measuring device 25 of suitable construction is connected and which also is equipped with a valve 26. The pipe 24 leads through the valve 26 to a reservoir for the desired gas. A conventional pouring ladle 28 rests upon a stone floor 27 within the vacuum vessel 20.

For the vacuum treatment of the steel pouring from the container 10 into the pouring ladle 28, the vacuum vessel 17 is evacuated through the pipe 22 by the vacuum pump so that any gases escaping from the liquid steel are withdrawn by the vacuum pump. In this case the valve 26 is closed. However, it is also possible to bring the liquid steel into contact with certain desirable gases by opening of the valve 26. Moreover, the pipe 24 may also be used for a comparatively quick and complete removal of gases, which escape from the liquid steel when the latter solidifies within the pouring ladle 28, in such a manner that air or a suitable gas is supplied into the vessel 17 through the pipe 24 and is again withdrawn through the pipe 22 by the vacuum pump.

It will now be explained in more detail with reference to Fig. 2 how undesirable air can enter into the vacuum vessel if steel is vacuum-treated with an arrangement according to Fig. 1, and how such a penetration of air into the vacuum vessel can be prevented by means of a shield according to the invention. Fig. 2 shows a section of a part of the bottom of the metal shell 11 of the container 10, and also the refractory interior lining 12 resting on the bottom 11, and finally the hereinbefore mentioned ceramic body 13, which is inserted into the interior lining and into the bottom. This ceramic body, which may also be made of fire-brick, is provided with the hereinbefore mentioned opening 14 into which another ceramic body 29 is inserted which has a channel 30 which is adapted to be closed by the rod 15 shown in Fig. 1. The body 29 with its channel 30 is held within the body 13 by means of a ring 31 which is connected to the bottom 11 by means of screws.

If the liquid steel passes from the container 10 through the opening 14 and the channel 30 into the vacuum vessel 17, then there is a danger that a certain quantity of air enters at the upper rim of the container 10 into the interspace between the interior lining 12 and the lateral wall of the metal container 11, which air then advances also between the interior lining 12 and the bottom 11, shown in Fig. 2, up to the ceramic body 13 and then enters between the lower side of the body 13 and the bottom 11 into the evacuated vessel 17. In order to block this path for the air, a shield 32 consisting of thin sheet metal is arranged according to the invention so that it surrounds the ceramic body 13, which shield is connected by welding at its lower rim with the bottom 11 and extends with its upper rim into the liquid metal. This shield 32 prevents not only the penetration of air into the vacuum vessel 17 along the path hereinbefore mentioned, but it also prevents the entry into the vacuum vessel of any air which may penetrate by diffusion through the material of the refractory interior lining 12 and through [through] the wall of the ceramic body 13 as well as through the wall of the ceramic body 29 into the channel 30.

The portion of Fig. 2 surrounded by a circle 33, is represented on an enlarged scale in Fig. 3. This figure shows again the refractory interior lining 12, the ceramic body 13 and the shield 32, and it can be seen that the interspace between the shield 32, the interior lining 12 and the ceramic body 13 is filled with a refractory mortar 34.

The portion of Fig. 2, surrounded by a circle 35, is represented on an enlarged scale in Fig. 4, which shows again the interior lining 12, the ceramic body 13, the screening surface 32, and the refractory mortar 34, and indicates that the lower rim of the shield is welded to the bottom 11 of the metal container by means of a sheet metal ring 36 which has a greater thickness than the sheet metal 32. The welding points are marked by 37 and 38.

Thus it is possible by the arrangement of the described sheet metal shield 32 to prevent safely air from entering into the evacuated vessel 17 when the liquid metal is transferred from the container 10 into the pouring ladle 28.

If it is desired to supply to the liquid metal within the container 10 certain gases through the opening 14 shown in Figs. 1 and 2 and through the channel 30, then it is possible with an arrangement according to Fig. 1 to close the valve 23 after the vessel 17 has been evacuated, and to fill the vessel through the open valve 26 with the desired gas and at the same time to produce within the vessel such an excess pressure that the desired gas, after the rod 15 has been lifted, enters into the liquid metal through the channel 30 and the opening 14. If there were no sheet metal shield 32, then part of the gas could escape in a direction opposite to the direction of the entering air as described hereinbefore. Such a loss of gas is completely avoided by the provision of the said sheet metal shield 32, and it is ensured that all the supplied gas actually enters the metal.

By loosening the screws by means of which the ring 31 is fastened to the bottom 11 of the metal container it is easily possible to exchange the interior ceramic body 29 after each pouring operation so that the opening 14 and the channel 30 can be always tightly closed by means of the rod [13] *15*.

Another construction of the sheet metal shield will be explained with reference to Fig. 5. In Fig. 5 the evacuated vessel 17 and the seal 16 are represented only schematically, and the metal container 10 has the form of a conventional pouring ladle. Also in this case the metal container consists of an outer shell 11 and of an interior refractory lining 12. The ceramic body 13 and the rod 15 have not been shown, since they are not required for the explanation of the construction of the sheet metal shield. The sheet metal shield may be given, as represented at 39, the shape of a sheet metal ring, the outer rim of which being welded to the internal face of the metal wall 11, whilst its outer rim projects into the liquid metal, the level of which is indicated by a chain dotted line 40. Also in this case a sheet metal ring 41, the inner rim of which projects into the liquid metal, may be connected by welding to a stronger sheet metal ring 42, and the latter may be connected by welding to the inner face of the metal wall 11, i.e. a construction may be adopted similar to that shown in Fig. 4.

The ring 39 and the ring 41 must be disposed always below the level 40 of the liquid metal similarly as the sheet metal 32 of Fig. 2 in order to prevent air from entering into the vacuum vessel 17 as well as a loss of gas which it is desired to introduce into the liquid metal.

Having now fully described our invention, what we claim as new and desire to secure by Letters Patent is:

1. A liquid-metal container suited to receive high-melting-point liquid metal, comprising an outer metal shell having an interior lining of refractory material, a body of ceramic material inserted into the bottom of the said interior lining and projecting through the outer metal shell which body has an opening formed therein, and a shield consisting of sheet metal which surrounds the said ceramic body and has two rims, one rim of which is connected [by welding] *gas-tightly* to the inner face of the metal shell, while the other rim projects into the space of the container reserved for the liquid metal so that said metal shield will extend into the liquid metal when said container is in operation.

2. A liquid-metal container according to claim 1, wherein a metal ring surrounds the rim of the shield adjacent to the metal shell, and wherein the metal ring is connected by welding to the metal shell and the said rim of the shield is connected by welding to the metal ring.

3. An arrangement for subjecting liquid metal to a gas-treatment, comprising a vessel air-tightly closed by a lid, which vessel is adapted to be evacuated, is provided with means for the supply of gas, and has a hole in its lid and suited to receive high-melting point liquid metal; and a liquid metal container comprising an outer metal shell having an interior lining of refractory material, a body of ceramic material having an opening formed therein, and inserted into the bottom of the said interior lining and projecting through said outer metal shell and a shield consisting of sheet metal which surrounds the said ceramic body and has two rims, one rim of which is connected [by welding] *gas-tightly* to the inner face of the metal shell, while the other rim projects into the space of the container reserved for the liquid metal so that said metal shield will extend into the liquid metal when said container is in operation; said liquid-metal container being placed above the lid of the vessel so that the opening in the said ceramic body comes to lie above the said hole in the lid, and means being provided for air-tightly connecting the bottom of the said liquid-metal container with the lid of the said vessel so as to prevent access of air to the said hole.

References Cited in the file of this patent or the original patent

UNITED STATES PATENTS

| | | |
|---|---|---|
| 1,674,947 | Bunce et al. | June 26, 1928 |
| 1,889,426 | Stout | Nov. 29, 1932 |
| 2,134,248 | Godenne | Oct. 25, 1938 |
| 2,134,785 | Goldberg | Nov. 1, 1938 |
| 2,230,141 | Heuer | Jan. 28, 1941 |
| 2,253,421 | De Mare | Aug. 19, 1941 |
| 2,416,490 | Molique | Feb. 25, 1947 |
| 2,462,699 | Wilcox | Feb. 22, 1949 |
| 2,631,836 | Willis | Mar. 17, 1953 |
| 2,665,895 | Herman | Jan. 12, 1954 |

FOREIGN PATENTS

| | | |
|---|---|---|
| 866,231 | Germany | Feb. 9, 1953 |
| 1,056,554 | France | Oct. 21, 1953 |